United States Patent [19]

Abel

[11] 4,383,075

[45] May 10, 1983

[54] THERMOSETTING ACRYLIC POLYVINYLIDENE FLUORINE COMPOSITION

[75] Inventor: Peter T. Abel, Berea, Ohio

[73] Assignee: SCM Corporation, New York, N.Y.

[21] Appl. No.: 261,771

[22] Filed: May 8, 1981

[51] Int. Cl.$^3$ .............................................. C08L 61/00
[52] U.S. Cl. ................................. 524/512; 524/520; 525/1.55
[58] Field of Search ............... 260/29.60 A; 525/155; 524/512, 520

[56] References Cited

U.S. PATENT DOCUMENTS

| | | | |
|---|---|---|---|
| 3,579,610 | 5/1971 | Petropoulos et al. | 260/853 |
| 3,770,685 | 11/1973 | Uffner et al. | 260/29.4 UA |
| 4,022,737 | 5/1977 | Seltmatias et al. | 260/29.4 UA |
| 4,118,537 | 8/1978 | Vary et al. | 428/422 |

Primary Examiner—Joseph L. Schofer
Assistant Examiner—Bernard Lipman
Attorney, Agent, or Firm—Thomas M. Schmitz

[57] ABSTRACT

An aqueous dispersed thermosetting coating composition comprises a high Tg acrylic latex polymer containing reactive hydroxyl and/or carboxyl groups, or similar reactive groups, for cross-linking the acrylic polymer, and a polyvinylidene fluoride polymer, wherein the composition is adapted to be heat cured at temperatures above about 350° F. The polyvinyl fluoride polymer fuses and becomes homogenously dispersed throughout the thermoset acrylic-melamine matrix polymer.

4 Claims, No Drawings

THERMOSETTING ACRYLIC POLYVINYLIDENE FLUORINE COMPOSITION

BACKGROUND OF THE INVENTION

This invention pertains to thermosetting aqueous dispersed acrylic, melamine resin, and polyvinylidene fluorine polymeric compositions capable of heat curing to form a homogenously cured surface coating.

Hydrofluorocarbon polymers dispersed in organic solvents are known such as disclosed in U.S. Pat. Nos. 3,340,222 and 3,324,069. Such coatings however require major amounts of an organic solvent which in turn causes undesirable pollution and solvent emission problems. Attempts to disperse polyvinylidene fluorocarbons into water dispersed latex emulsions systems such as acrylic latexes to provide highly durable coatings have been unsuccessful. A water dispersed fluorocarbon is shown in U.S. Pat. No. 3,679,618. Curing and coalescense of the latex mixture often produced non-uniform films containing polymer particles dispersed in the film. For example a conventional film forming acrylic latex having a Tg around 20° C. produces a non-homogenous surface coating film containing discreet particles of fluorocarbon polymer. The non-homogenously dispersed fluorocarbon polymer undesirably tends to cause premature film failure at the locale of the particle particularly due to ultraviolet light degradation thus causing poor durability and undesirable film integrity properties. U.S. Pat. No. 4,141,873 discloses an air dry latex polymer containing vinylidene fluorine polymer dispersed therein wherein the latex polymer may coalesce to form a film leaving discreet vinylidene fluorine polymer particles entrapped in said film.

It now has been found that water dispersed high Tg acrylic latex having carboxyl and/or hydroxyl groups or other functional reactive groups in combination with melamine and water dispersed polyfluorohydrocarbon polymer advantageously produces an excellent surface coating composition adapted to cure at temperatures above about 350° F. (177° C.) to produce a homogenous film relatively free of entrapped dispersed fluorocarbon polymer particles. It has been found that by providing a high Tg thermosetting acrylic polymer having a Tg greater than 50° C. advantageously narrows the Tg differential between the acrylic and polyfluorohydrocarbon polymer, which in turn advantageously avoids premature coalescence of the acrylic polymer and avoids isolation of the polyfluorohydrocarbon polymer particles in the cured coalesced surface coating film. The resulting film exhibits excellent film integrity properties including ultraviolet light resistance, elasticity, flexability, toughness, salt spray resistance, adhesion, moisture resistance, and outdoor durability. These and other advantages will become more apparent by referring to detailed description and the illustrative examples.

SUMMARY OF THE INVENTION

Briefly, the invention pertains to an aqueous dispersed polymeric composition comprising a high Tg acrylic polymer having reactive groups and a Tg above about 50° C., melamine, and a polyvinylidene fluorine polymer wherein the polymeric combination is adapted to be heat cured at temperatures above about 350° F. (177° C.) to produce a thermoset uniform homogenous protective coating surface film. The polyvinylidene fluoride resin can be dispersed in water by vigorous agitation such as a Cowles mixer to provide polymer dispersion which can be mixed with the melamine and the high Tg acrylic latex. The coating composition can be cured at temperatures above about 350° F.

DETAILED DESCRIPTION OF THE INVENTION

The composition of this invention comprises a high Tg acrylic polymer containing reactive groups capable of self cross-linking like amides and/or carboxyl and/or hydroxyl groups, in combination with melamine and a polyvinylidene fluorine polymer dispersed in water to provide a protective coating composition capable of heat curing at temperatures above about 350° F.

Referring first to the high Tg acrylic polymer, such acrylic polymers containing functional groups comprise emulsion polymerized ethylenically unsaturated monomers to produce acrylic homopolymers or copolymers provided the glass transition temperature (Tg) of the polymer is at least about 50° C. Ethylenic monomers undergo addition polymerization of ethylenically unsaturated double bonds, and such monomers can include for example acrylates and methacrylates such as alkyl acrylates and methacrylates such as ethyl acrylate, butyl acrylate, 1,6-hexanediol diacrylate, ethylthioethyl methacrylate, methyl acrylate, isobornyl acrylate, 2-hydroxyethyl acrylate, 2-phenoxyethyl acrylate, glycidyl acrylate, 2-ethylhexyl acrylate, neopentyl glycol diacrylate, 2-ethoxyethyl acrylate, t-butylaminoethyl methacrylate, 2-methoxyethyl acrylate, methyl methacrylate, glycidyl methacrylate, benzyl methacrylate, ethyl methacrylate, acrylic acid, methacrylic acid, N-methyl methacrylamide, acrylonitrile, methacrylonitrile, acrylamide, N-(isobutoxymethyl)acrylamide, and the like. The acrylic monomers can be copolmerized with other ethylenically unsaturated monomers including vinyl monomers such as 1,3-butadiene 2-methyl-1,3-butadiene, 2,3-dimethyl-1,3-butadiene, allylbenzene, diacetone acrylamide, vinylnapthalene, chlorostyrene, 4-vinyl benzyl alcohol, vinyl benzoate, vinyl propionate, vinyl caproate, vinyl chloride, vinyl oleate, dimethyl maleate, dimethyl fumarate, vinyl sulfonic acid, vinyl sulfonamide, methyl vinyl sulfonate, and preferably N-vinyl pyrolidone, vinyl pyridine, styrene, alpha-methyl styrene, tertiary butyl styrene, vinyl toluene, divinyl benzene, vinyl acetate, and vinyl versatate.

The ethylenically unsaturated monomers can be co-polymerized to form acrylic homopolymers or copolymers by adding the ethylenic monomers to water along with surfactants and polymerizing catalysts or initiators as well as other emulsion polymerization ingredients. Initiators can include for example, typical free radical and redox types such as hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyonitrile, ammonium persulfate, sodium persulfate, potassium persulfate, sodium perphosphate, potassium perphosphate, isopropyl peroxycarbonate, and redox initiators such as sodium persulfate-sodium formaldehyde sulfoxylate, cumene hydroperoxide-sodium metabisulfite, potassium persulfate-sodium bisulfite, cumene hydroperoxide-iron (II) sulfate, etc. The polymerization initiators are usually added in amounts between about 0.1 to 2 weight percent based on the monomer addition. Suitable anionic surfactants include for example, salts of fatty acids such as sodium and potassium salts of stearic, palmetic, oleic, lauric, and tall oil acids, salts of sulfated fatty alcohols, salts of phosphoric acid esters of polyethylated long chain alcohols and phenols, etc. Preferred anionic surfactants include for example, alkylbenzene sulfonate salts such as sodium dodecylbenzene sulfonate and salts of hexyl, octyl, and higher alkyl diesters of 2-sulfosuccinic acid, etc. Suitable non-ionic surfactants include polyoxyethylene glycols reacted to a lyophilic compound to produce a hydrophile-lyophile balance (HLB) greater than 2 and preferably between about 10 and 15 as set forth in U.S. Pat. No. 3,423,351. Suitable non-ionic surfactants include for example, ethylene oxide condensation products reacted with t-octylphenol or nonylphenol and known as "Triton" surfactants, polymerized oxyethylene (IgepalCA), ethylene oxide reacted with organic acid (Emulfor), or organic acid reacted with polyoxyamylene ether of stearic or oleic acid esters (Tweens).

The high Tg acrylic latex polymer has a glass transition temperature (Tg) above 50° C. and preferably between 50° C. and 120° C. The term "glass transition temperature" is a term well known in the art and generally defines the onset of long range molecular motion wherein the polymer preserves the outward appearance of a solid but becomes rubbery and then tacky with increasing temperature and undergoes plastic flow and elastic deformation. A polymer particle having a glass transition temperature greater than room temperature will be a non-film-former at room temperature. The glass transition temperature can be measured in accordance with Volume 41 Journal of Paint Technology, pages 167–178 (1969). The glass transition temperatures (Tg) are best measured when such polymer particles are in the latex wherein interacting effects of various ingredients are taken into account such as coalescing agents. The Tg can be calculated in accordance with the Fox equation, or measured by ASTM 3418-75, or estimated by testing for a Viacat softening point as set forth in ASTM 1525. The high Tg acrylic polymer containing reactive carboxyl and/or hydroxyl groups or other functional reactive groups can be coreacted with melamine resin upon heating to produce a thermoset polymeric structure.

The functional groups of the latex that are capable of coreacting with an aminoplast resin or self cross-linking, said functionality may be hydroxyl, carboxyl or amide and may be present individually or in combinations thereof.

Referring now to the melamine resin adapted to cross-link with the high Tg acrylic resin, melamine resins are melamine-formaldehyde or other aminoplast resins including melamine or melamine derivatives such as methylol melamine or similar alkylated melamine-formaldehyde reactive resins commonly referred to as aminoplast resins.

Referring next to fluorocarbon polymers, desirable fluorocarbons are primarily based on polyvinylidene fluoride polymers being linear thermoplastic high molecular weight polymers produced by copolymerization of unsaturated vinylidene fluoride monomer to provide repeating polymer units of $(CH_2-CF_2)_n$, such as a homopolymer known as "Kynar", a trademark of Pennwalt Corporation. Fluorocarbon polymers can further include high molecular weight copolymers of primarily polmerized vinylidene fluoride monomer with minor amounts of other fluorine monomers such as tetrafluoroethylene, trifluoroethylene, chlorotrifluoroethylene, hexafluoropropene, as well as similar alkyl polyfluoro monomers. Fluorocarbon polymers ordinarily have a Tg above about 50° C. Some fluorocarbon resins can be dispersed in water by high shear mixing such as a Cowles mixer, when properly mixed with small amounts of selected alcohols, amines and anionic surfactants.

The polymeric composition of this invention preferably comprises on a weight basis between about 4% and 95% high Tg reactive acrylic polymer, between 1% and 30% melamine cross-linking resin, and between 4% and 95% fluorocarbon resin. The polymeric coating composition can be applied to a substrate as a clear film or as a pigmented coating, and then the coating is heat cured at temperatures above about 300° F. (149° C.) and preferably between 350° F. (177° C.) and 500° F. (260° C.). At these temperatures the fluorocarbon polymer fuses and becomes homogenously dispersed throughout the film with the fused and coalesced high Tg acrylic polymer whereupon the functional acrylic polymer cross-links during heat curing to produce a thermoset matrix no longer containing discreet particles, but rather containing fluorocarbon polymer uniformly distributed therein. The resulting cured film is substantially free of isolated fluorocarbon polymer particles and provides excellent durability, adhesion, salt spray resistance on metal substrates as well as other desirable film integrity properties. The advantages of the water reduced thermosetting composition containing fluorocarbon polymer are further illustrated in the following examples.

EXAMPLE 1

A thermosetting water dispersed polymeric composition comprising acrylic polymer, melamine and fluorohydrocarbon was produced in accordance with this invention from the following components.

|  | Weight Parts |
|---|---|
| Acrylic latex Tg = 75° C. (50% Water) (89/9/1 weight ratio MMA/acrylamid/acid) N.V. 50% | 66 |
| Melamine - Cymel 303 | 5 |
| Fluorohydrocarbon polymer - Kynar | 60 |
| Propylene glycol | 40 |
| Diisopropylaminoiethanol (Any type of base) | 3 |
| Defoamer | 0.5 |
| Anionic surfactant (60% Water) | 5 |
| Water | 15 |
| Red Oxide Pigment | 30 |

The above components except for the acrylic latex provided a mix for dispersing pigment and fluorohydrocarbon resin therein, whereupon the acrylic latex was subsequently added. A paint coating was cured on a metal test panel at 282° C. for 50 seconds. The test panel was then exposed to U.V. light in a Dew Cycle Weatherometer to induce chalking. After 500 hours exposure, the test film still showed excellent resistance to chalking comparable to solvent based fluorocarbon coatings.

EXAMPLE 2

In a manner similar to Example 1, compositions were produced without pigment and containing a weight ratio of 40/60 of Kynar 500/thermoset acrylic polymer.
 (a) Acrylic Latex Tg=17° C. (MMA/BA/2HEA)
 (b) Acrylic Latex Tg=75° C. (MMA/acrylamid/acid)

Clear films were cured on substrates and tested in the Weatherometer as follows. Chalk rating is 1-10 with 10 being no chalking.

|  | Hours | | | | |
| --- | --- | --- | --- | --- | --- |
|  | 50 | 100 | 150 | 200 | 250 |
| Acrylic (a) | 6 | 4 | 4 | 3 | 3 |
| Acrylic (b) | 10 | 10 | 10 | 10 | 9 |

EXAMPLE 3

In a manner similar to Example 2, a thermoset acrylic latex was combined with Kynar on a weight ratio of 50 parts acrylic polymer per 50 parts Kynar. The monomer composition was varied to provide a variable Tg while the functionality was kept constant. MMA was increased incrementally and BA was reduced to provide increasing Tg. Clear films were cured and were tested in the Dew Cycle Weatherometer for 275 hours.

| Tg | MMA/BA | Chalking |
| --- | --- | --- |
| 17° C. | 50/36 | 3 |
| 32° C. | 56/30 | 3 |
| 50° C. | 62/24 | 5 |
| 61° C. | 68/18 | 10 (no chalking) |
| 69° C. | 74/12 | 10 |
| 81° C. | 80/6 | 10 |
| 89° C. | 85/1 | 10 |

The foregoing examples are illustrative only and are not intended to be limiting except by the appended claims.

I claim:

1. An aqueous heat curable coating composition for use as a protective surface coating wherein the composition contains a thermosetting binder composition comprising:

on a weight basis, between about 4% and 95% fluorocarbon resin, between 4% and 95% high Tg reactive acrylic emulsion polymer having a Tg greater than 50° C., and between 1% and 30% melamine resin adapted to react with said acrylic polymer upon heating to form a cross-linked matrix, said composition adapted to be heat cured at temperatures above about 177° C.

2. The composition of claim 1 wherein the acrylic polymer contains reactive groups selected from amides, carboxyl or hydroxyl groups.

3. The composition in claim 2 wherein the composition can be heat cured at temperatures between about 177° C. and 260° C.

4. In a process for heat curing an aqueous thermosetting coating composition containing fluorocarbon resin, reactive acrylic polymer, and melamine adapted to react with said acrylic polymer upon heating, the improvement comprising:

providing a reactive acrylic emulsion polymer with a Tg greater than 50° C. whereby said acrylic emulsion polymer and said fluorocarbon polymer become uniformly interdispersed upon heating above 177° C., whereby the composition heat cures to provide a cross-linked polymeric matrix containing fluorocarbon homogenously dispersed therein.

* * * * *